US006088899A

United States Patent [19]

Zagorski

[11] Patent Number: 6,088,899

[45] Date of Patent: Jul. 18, 2000

[54] ANTI-SPLASH APPARATUS FOR SECURING THE LID OF A CONTAINER

[76] Inventor: Michael Zagorski, 1934 Pleasant St., Walla Walla, Wash. 99362

[21] Appl. No.: 09/218,861

[22] Filed: Dec. 22, 1998

[51] Int. Cl.[7] .......... B25B 27/14; B23P 19/02

[52] U.S. Cl. .......... 29/275; 29/525

[58] Field of Search .......... 220/255, 256, 220/699, 700, 701, 694, 315, 729, 730, 733; 215/273, 274, 277; 29/275, 525

[56] References Cited

U.S. PATENT DOCUMENTS

| | | | |
|---|---|---|---|
| 3,715,865 | 2/1973 | Davis . | |
| 3,727,792 | 4/1973 | Levin | 220/90 |
| 3,850,341 | 11/1974 | Bart . | |
| 4,352,438 | 10/1982 | Carino | 220/90 |
| 5,165,562 | 11/1992 | Raney | 220/307 |
| 5,174,464 | 12/1992 | Watt | 220/256 |
| 5,261,551 | 11/1993 | Watt | 220/256 |
| 5,381,918 | 1/1995 | Dahl | 220/256 |
| 5,568,879 | 10/1996 | Kovathana | 220/697 |
| 5,803,298 | 9/1998 | Hausmann | 220/319 |
| 5,839,598 | 11/1998 | Mitchell | 220/321 |

*Primary Examiner*—S. Thomas Hughes
*Assistant Examiner*—Eric Compton
*Attorney, Agent, or Firm*—Liebler, Ivey & Connor; Steven J. Staihar

[57] ABSTRACT

An apparatus for securing the lid of a container without causing any substance which has collected in the can rim to splash during the recovering process. More particularly this invention relates to an apparatus that secures the lid of a standard gallon or quart size paint can. The invention has an intermediate annular wall and an annular flange such that, when force is applied to the impact surface, as from a hammer or mallet, the lid is secured to the can, and any paint that has collected in the annular ring and sealing groove of the can is prevented from splashing. The apparatus is designed for use with cans or containers of different sizes.

7 Claims, 3 Drawing Sheets

ANTI-SPLASH APPARATUS FOR SECURING THE LID OF A CONTAINER

FIELD OF THE INVENTION

The present invention relates generally to an apparatus for securing the lid of a container. In particular, this invention relates to an apparatus for securing the lid of paint cans. More particularly, the invention relates to an apparatus for securing the lid of a standard quart and gallon size paint can more efficiently with fewer hammer or mallet hits and without splashing any paint that has collected in the annular sealing ring and sealing groove of the can.

BACKGROUND OF THE INVENTION

Containers typically comprise a can, a lid, and various means of sealing the lid to the can. A common container comprises a can with a sealing rim, an annular ring, and an annular sealing groove to receive the can cover or lid therein. Such containers are commonly used to store a variety of materials such as liquids including paint.

To secure the lid on such a container, the user typically applies force, via a mallet or hammer, to the outer edges of the lid. This method is cumbersome and time-consuming because while the force may push part of the lid's sealing ring down into the sealing groove of the can, the force instantaneously causes the opposite part of the lid to be pushed upward. The user must continually pound back and forth on the edges of the lid many times to secure the lid.

It will be further appreciated by those skilled in the art that the liquid contents can collect in the rim of the can during use. This creates numerous problems for one attempting to secure the lid onto the can. The liquid in the annular ring or sealing groove may have hardened thereby making it more difficult, perhaps impossible, to secure the lid. If the liquid contents have not hardened, the contents in the rim will splash out in the immediate area upon the application of force to the lid.

The prior art addresses the problem of accumulated liquid in the can rim. The approaches generally involve redesigning the lid or involve a protective device to prevent liquid from accumulating in the rim of a can. U.S. Pat. No. 5,165,562 to Raney discloses an anti-splash paint can cover made of flexible plastic that can be installed or removed using a handle and without using any tools. U.S. Pat. No. 4,352,438 to Carino discloses a protective device for temporarily shielding the upper surfaces of an open liquid container from accumulating liquid in the upper surface. Likewise, U.S. Pat. No. 3,727,792 to Levin discloses an attachment to the rim of a can to prevent paint from entering the friction groove and/or contact the inner and outer beads of the rim, and allowing a brush to be pressed thereagainst to cause excess paint to flow into the interior of the container. U.S. Pat. No. 5,381,918 to Dahl discloses a device for securing the lid of a can against opening when this is not desired.

The foregoing patents and printed publications are provided herewith in an Information Disclosure Statement in accordance with 37 CFR 1.97.

SUMMARY OF THE INVENTION

It is an object of the present invention to provide an apparatus for securing the lid of a container. The disclosed apparatus provides a more efficient technique than the prior art by reducing the effort and amount of time to secure the lid.

Another object of the present invention is to provide an apparatus for securing the lid of a can that prevents any liquid such as paint, which has collected in the annular ring and sealing groove of the can, from splashing when the lid is secured onto the can.

Another object of the present invention is to provide an apparatus for use with both gallon and quart size cans that will prevent any of the liquid contents such as paint, which have collected in the annular ring and sealing groove of the can rim, from splashing when the lid is re-secured onto the can.

Another object of the invention is to provide an apparatus for securing the lid of a container that can be easily cleaned even after any liquid has dried on the apparatus.

These and other objects of the invention are attained by means of an apparatus to secure the lid of a can with an annular sealing rim and an annular sealing groove to receive the can cover or lid therein. The apparatus comprises an impact surface, and at least one annulus adapted to fit over can lids of various sizes. For example, at least one annulus may be adapted to fit over standard quart size and gallon size cans. An upper annular wall extends downwardly from the perimeter of the impact surface and merges with the at least one annulus uppermost to said impact surface at the inner perimeter of said annulus. Each of the at least one annulus below said uppermost annulus is joined to the adjacent at least one annulus by an intermediate annular wall, said wall extending downwardly from the outer perimeter of the at least one annulus and merging with the lower adjacent annulus at the inner perimeter of said adjacent annulus. An annular flange extends downwardly from the outermost annulus to some point therefrom. To use the apparatus, the apparatus is placed over the lid on the top of a can, whereby the bottom the at least one annulus that is closest in size to fit the lid, contacts the lid of the can. Force is applied to the impact surface with a tool such as a mallet or hammer, thereby forcing the lid's sealing ring into the annular sealing groove and sealing the can. The annular wall and flange elements prevent any liquid that has collected in the annular ring or sealing groove from splashing into the surrounding area upon securing the lid to the can.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 shows the impact surface and perimeter, uppermost and lowermost annuluses, inner and outer perimeters of uppermost and lowermost annuluses, upper annular wall, intermediate annular wall, annular flange, and reinforcing gussets.

DETAILED DESCRIPTION OF THE PREFERRED EMBODIMENT

Figure 1:
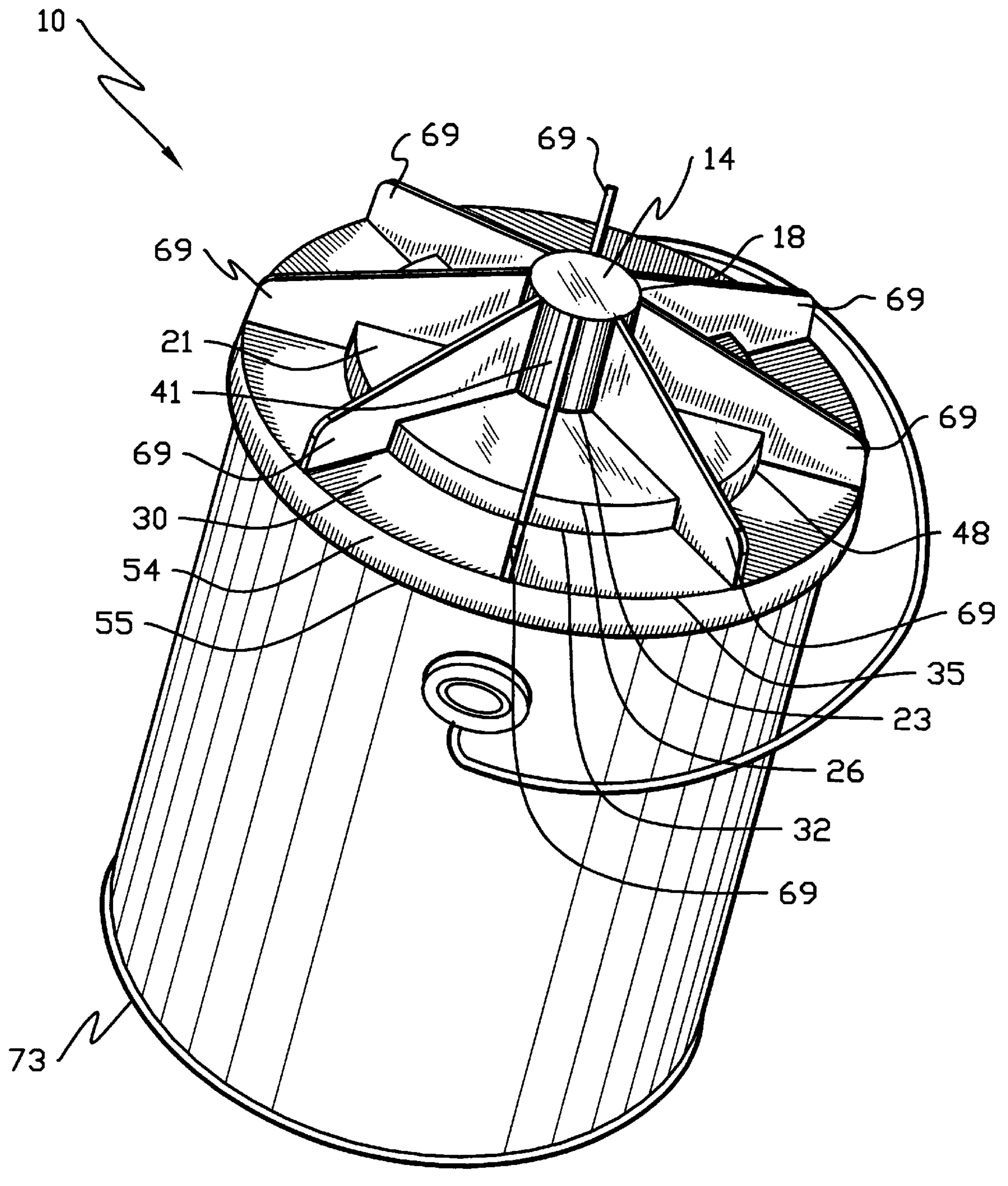
FIG. 1 is a perspective view of a can with the apparatus positioned over the lid on the top of the can.
Figure 2:
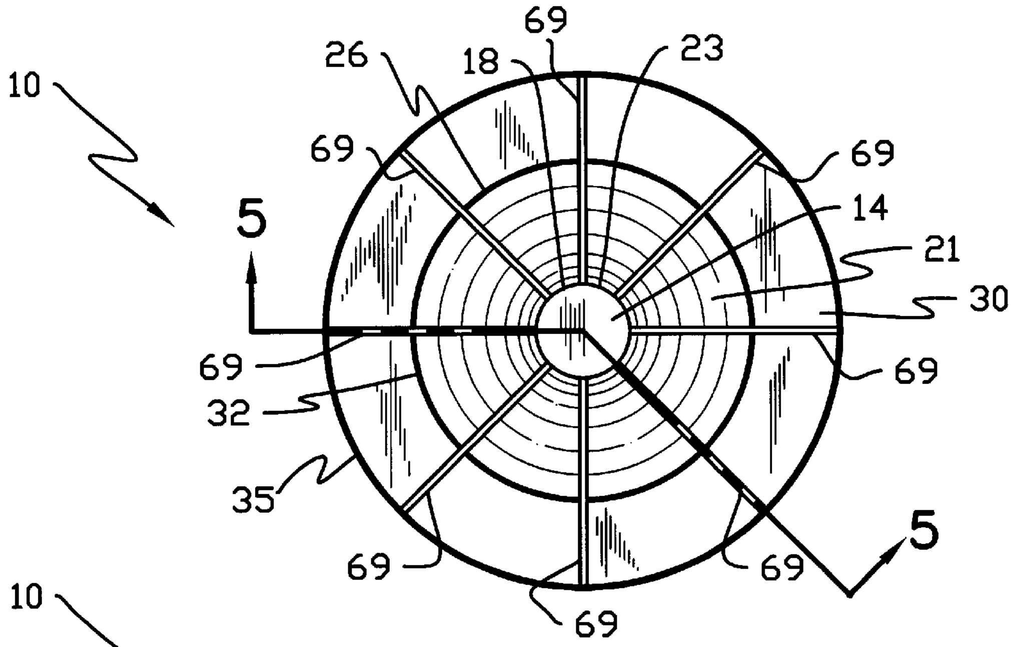
FIG. 2 is a top plan view of the apparatus showing the perimeter of the impact surface, and the inner and outer perimeters of the uppermost and lowermost annuluses. Also shown are the reinforcing gussets.
Figure 3:
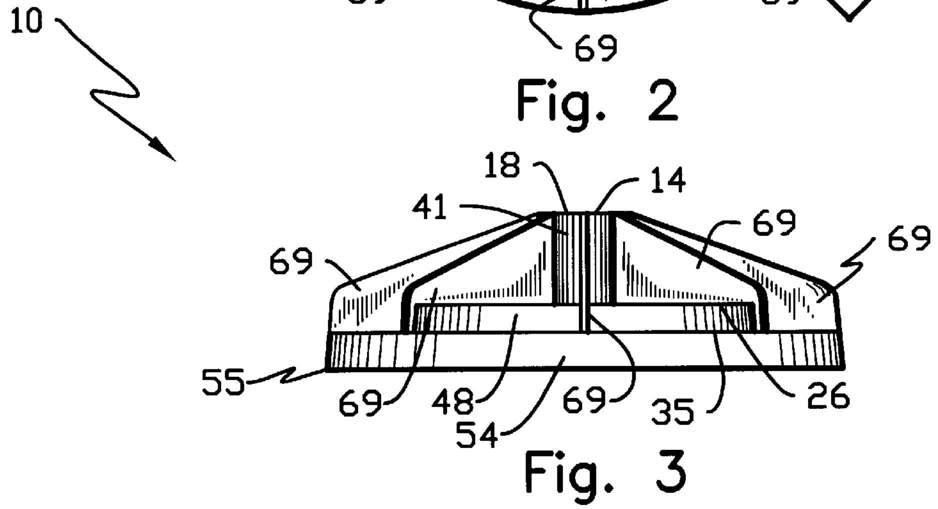
FIG. 3 is an elevation and section view from FIG. 1 showing the upper annular wall, intermediate annular wall, annular flange, and reinforcing gussets.
Figure 4:
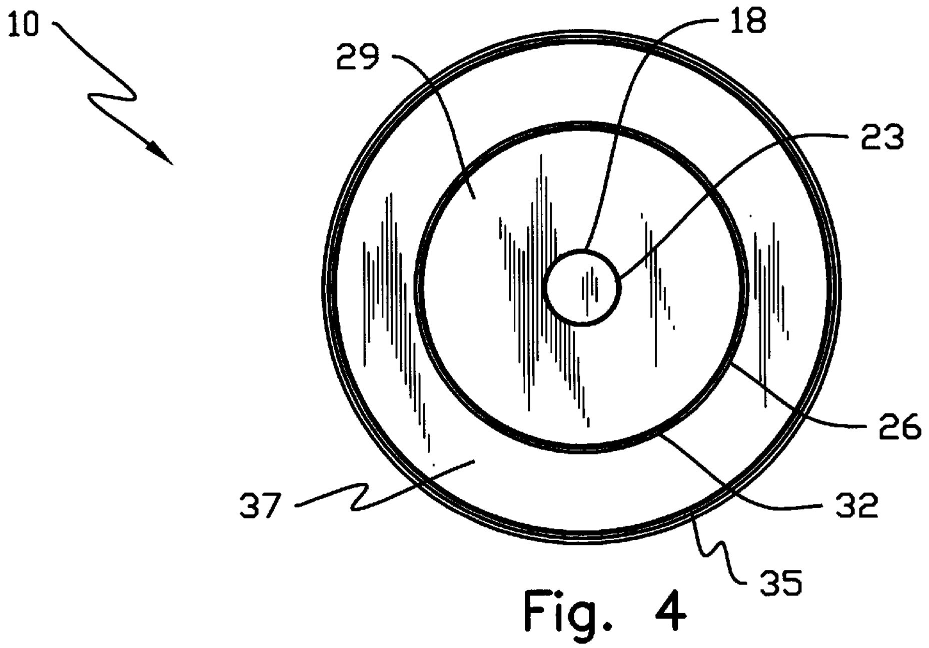
FIG. 4 is a bottom view of the apparatus showing the bottom of the uppermost annulus, the bottom of the lowermost annulus, the inner and outer perimeters of the uppermost and lowermost annuluses, and the perimeter of the impact surface.

The preferred embodiment of the anti-splash apparatus for securing the lid of a container herein disclosed is depicted in FIGS. 1, 2, 3, 4, and 5. As shown in FIG. 1, the invention 10 is an apparatus that fits over the lid on the top of a can 73. The invention 10 is a single piece construction unit formed from resilient material, including for example plastics, and is adapted for use with cans of various sizes, including for example, one gallon, one quart, and one liter volume cans.

The apparatus 10 comprises an impact surface 14 with perimeter 18 and at least one ring-like annulus with inner and outer perimeters, positioned concentrically to said impact surface 14. The at least one annulus with the smallest outer perimeter being the uppermost annulus 21 to said impact surface 14, the at least one annulus with the largest outer perimeter being the lowermost annulus 30 to said impact surface 14. The preferred embodiment comprises a ring-like uppermost annulus 21 with inner perimeter 23, outer perimeter 26, and bottom 29. The preferred embodiment further comprises a ring-like lowermost annulus 30 with inner perimeter 32, outer perimeter 35, and bottom 30. The bottom of the uppermost annulus 29 may be of a size to be received by standard quart size can lids. The bottom of the lowermost annulus 30 may be of a size to be received by one gallon size can lids. As best shown in FIG. 1, an upper annular wall 41 extends downwardly from the perimeter of the impact surface 14 and merges with the uppermost annulus 21 at the inner perimeter 23 of the uppermost annulus 21. Each at least one annulus is joined to the adjacent at least one annulus by an intermediate annular wall 48, said wall extending downwardly from the outer perimeter of the at least one annulus and merging with the lower adjacent annulus at the inner perimeter of said adjacent annulus. As shown in the example illustrated in FIG. 1, an intermediate annular wall 48 extends downwardly from the outer perimeter 26 of the uppermost annulus 21 and merges with the lowermost annulus 30 at the inner perimeter 32 of the lowermost annulus 30. The intermediate annular wall 48 may extend downwardly generally normal to the plane of the uppermost annulus 21 or may extend downwardly forming an obtuse angle with the plane of the uppermost annulus 21. A peripherally positioned annular flange 54 extends downwardly from the lowermost annulus 30. The annular flange 54 may extend downwardly generally normal to the plane of the lowermost annulus 30 or may extend downwardly forming an obtuse angle with the plane of the lowermost annulus 30. Reinforcing gussets 69, which are best shown in FIG. 1, extend from the upper annular wall 41 to the lowermost annulus 21 and to the uppermost annulus 30, and provide structural strength to the apparatus.

Figure 5:
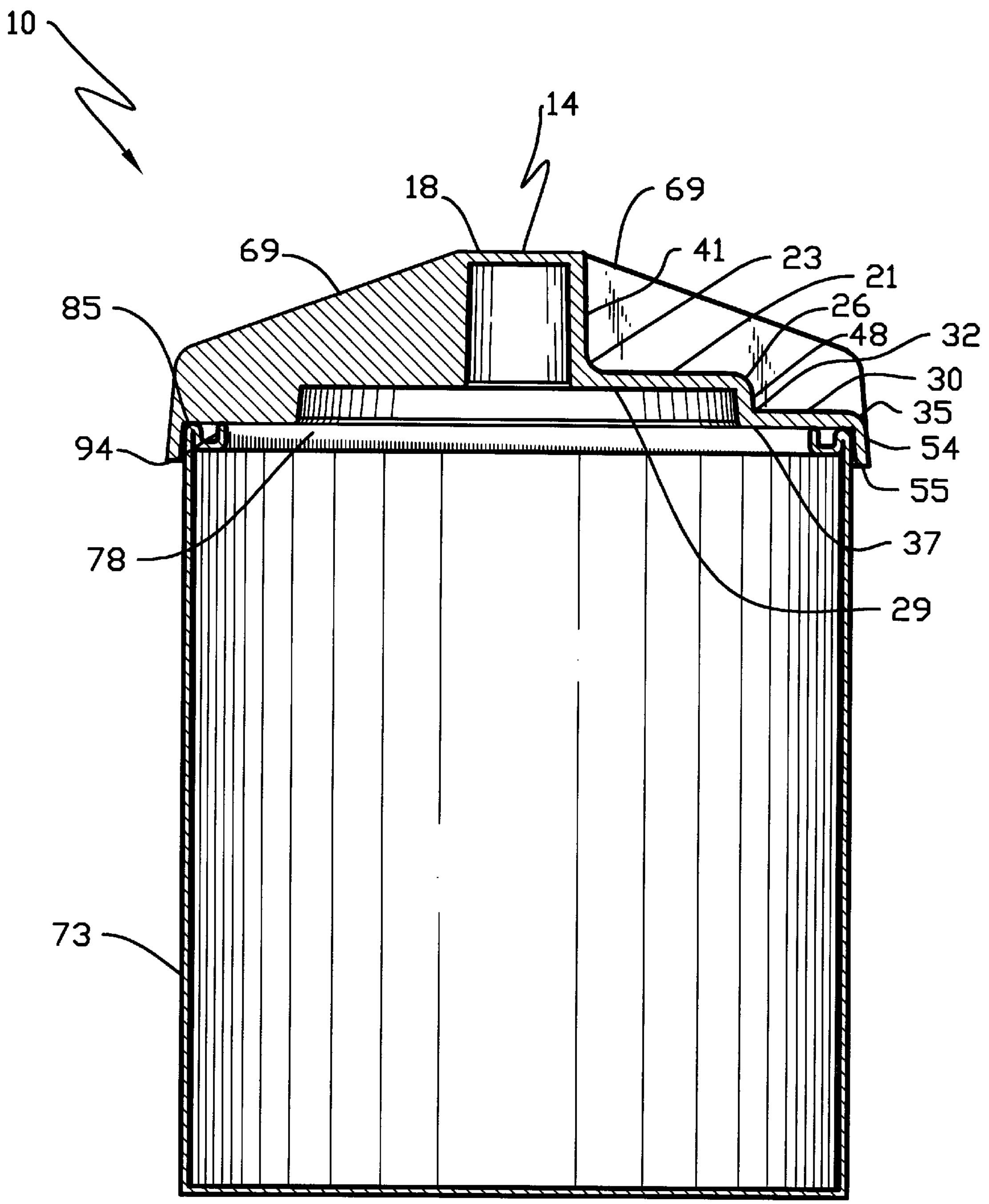
FIG. 5. is a cross-section view according to line 5—5 of FIG. 2 of the apparatus positioned on a can. The rim of the paint can is shown as well as the can's annular ring and sealing groove. Also shown are the uppermost annulus, lowermost annulus positioned over the rim of the can, upper annular wall, intermediate annular wall, reinforcing gussets, and the annular flange of the apparatus.

To reseal a can, the invention is placed over the lid on the top of a can 73 as shown in FIG. 5, whereby the bottom of the at least one ring-like annulus that is closest in size to fit the lid, is to be received by the container lid. In the example shown in FIG. 5, the bottom of the lowermost annulus 30 contacts the lid of the can 73. If the can is a smaller size, such as a standard one quart can, the bottom of the uppermost annulus 29 contacts the can lid. Force is applied to the impact surface 14 with a tool such as a mallet or hammer. The force pushes the lid's sealing ring into the annular sealing groove 94 thereby sealing the can. Any paint in the can's annular ring 85 or sealing groove 94 is prevented from splashing into the surrounding area by the flange 54. If the can is a smaller size, such as a standard one quart can, the bottom of the lowermost annulus 29 contacts the lid and the force pushes the lid's sealing ring into the annular sealing groove 94 thereby sealing the can. Any liquid such as paint that has accumulated in the annular ring 85 or sealing groove 94 is prevented from splashing into the surrounding area by the intermediate annular wall 48.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An apparatus for securing the lid of a container, comprising:

A. an impact surface with a perimeter;

B. at least two ring-like annuli each having an inner perimeter, an outer perimeter, and a bottom, positioned concentrically to said impact surface, at least one of the at least two annuli comprising an annulus with a smallest outer perimeter and being an uppermost annulus with respect to said impact surface, another of the at least two annuli comprising an annulus with a largest outer perimeter and being a lowermost annulus with respect to said impact surface;

C. the bottom of the at least two ring-like annuli that is closest in size to fit the lid is to be received by the container lid;

D. an upper annular wall extending downwardly from the perimeter of the impact surface and merging with said uppermost annulus at the inner perimeter of said uppermost annulus;

E. each at least two annuli being joined to the adjacent at least two annuli by an intermediate wall, said intermediate wall extending downwardly from the outer perimeter of the uppermost annulus and merging with a lower adjacent annulus at the inner perimeter of said lower adjacent annulus; and F. a peripherally positioned annular flange extending downwardly from the perimeter of the lowermost annulus.

2. The apparatus of claim 1 wherein an angle of downward extension between the intermediate annular wall and the plane of the uppermost annulus from which the annular wall extends is obtuse.

3. The apparatus of claim 1 wherein an angle of downward extension between the annular flange and the plane of the lowermost annulus is obtuse.

4. The apparatus of claim 1 further comprising reinforcing gussets extending from the upper annular wall to the at least two ring-like annuli, thereby providing structural strength to the apparatus.

5. The apparatus of claim 1 wherein the bottom of the annulus that is closest in size to fit the lid is of a size to be received by a standard quart size can lid.

6. The apparatus of claim 1 wherein the bottom of the annulus that is closest in size to fit the lid is of a size to be received by a one gallon size can lid.

7. The apparatus of claim 1 composed of a single piece construction unit formed from resilient material.

* * * * *